Aug. 6, 1935.   H. EMMENS   2,010,069
DEVICE FOR RECTIFYING ALTERNATING VOLTAGES
Filed Oct. 23, 1931
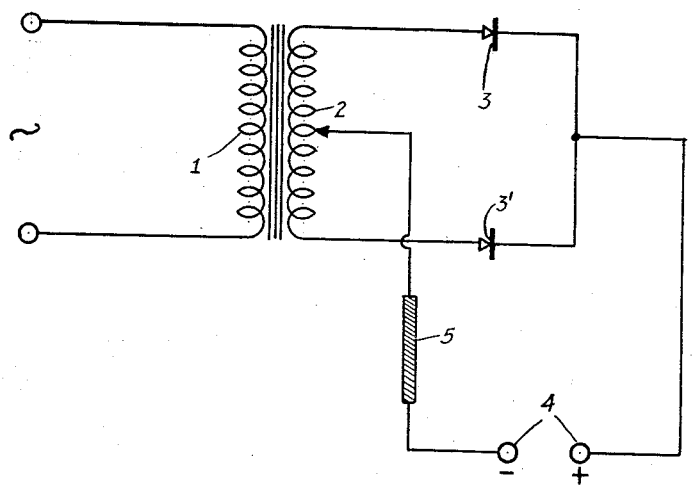
INVENTOR
HENDRIK EMMENS
BY
ATTORNEY Patented Aug. 6, 1935

2,010,069

UNITED STATES PATENT OFFICE 2,010,069

DEVICE FOR RECTIFYING ALTERNATING VOLTAGES

Hendrik Emmens, Eindhoven, Netherlands, assignor to Radio Corporation of America, a corporation of Delaware Application October 23, 1931, Serial No. 570,667
In Germany February 3, 1931

1 Claim. (Cl. 175—363)

Radio-apparatus and other devices comprising thermionic valves which are destined to be connected to an alternating current network, require rectifiers for converting the alternating current into a direct current. Since the direct voltages to be applied to the anodes and to the grids must be very constant, there are always needed devices for smoothing the rectified, still undulating voltage. Now it is possible to have the voltages for the anodes as well as those for the grids of the various valves supplied by a single rectifier with a smoothing device. Since this is, however, rather uneconomical a separate rectifier is frequently utilized for the negative grid bias which rectifier must also be provided with a smoothing device.

The invention has for its object to provide a device destined for the supply of direct voltages, more particularly of the negative grid bias, for thermionic valves and being economical both as regards its initial cost and its operation.

According to the invention, a direct voltage is obtained with the aid of a two-phase electrolytic or dry rectifier which acts simultaneously as a smoothing condenser.

The invention will be explained more fully with reference to the accompanying drawing in which one embodiment is represented by way of example.

The device shown comprises a transformer having a primary winding 1 which is connected to the alternating current network. Both ends of the secondary winding 2 are connected to poles of like sign of electrolytic or dry rectifiers 3 and 3' which, for example, pass the current in the direction indicated by the arrows. The direct voltage is taken from terminals 4 which are connected to the mid-point of the secondary transformer winding and to the two other mutually connected electrodes of the rectifier. It is desirable in this case to include a large resistance 5 in one of the supply leads.

It has been found that a smoothing device is not absolutely necessary. An explanation thereof may be found in the fact that during the lapse of time in which the current passes through one of the rectifiers, the other acts as a condenser and is charged.

The device may be particularly advantageous if the direct current taken from it has a slight value and the required voltage is not too high, consequently, for example, for the supply of the negative grid bias although in principle it may also be utilized for the supply of the anode voltage.

While the invention has been described in connection with electrolytic rectifiers it is to be understood that any type of rectifier which acts like a large capacity during the time when back voltage is on it is contemplated, such, for instance, as copper-oxide rectifiers.

I claim:

In a low load, low voltage rectifier system which includes a bi-phase rectifier circuit comprising two rectifier units of a type having substantial capacitive and resistance effects for current flow in one direction and low resistance and capacitive effects for current flow in the opposite direction, said two units being arranged in said system so that for current flow in one direction one thereof presents high resistance, high capacity effects, while the other thereof presents low resistance, low capacity effects and vice versa on reversal of current, and wherein a utilizing circuit is connected to the output of the rectifier system, the method of supplying the utilizing circuit with substantially steady uni-directional current from the rectifier system which comprises drawing from the rectifier system only a very small percentage of the available rectified current and passing this current through a very high series resistance path whereby the current is capable of being substantially completely smoothed by the filtering action of the alternate capacitive effects of the rectifier units and the high resistance path.

HENDRIK EMMENS.